Patented July 15, 1947

2,424,083

UNITED STATES PATENT OFFICE 2,424,083

SUPPORTED SILVER CATALYST

Harry de V. Finch, Berkeley, Calif., and Ingolfur Bergsteinsson, Billings, Mont., assignors to Shell Development Company, San Francisco, Calif., a corporation of Delaware No Drawing. Application August 11, 1943, Serial No. 498,428

7 Claims. (Cl. 252—204)

This invention relates to silver catalysts, particularly to those used in the direct catalytic oxidation of olefins to olefin oxides, and to a method for the preparation of such silver catalysts. More specifically, the invention is directed to novel catalysts comprising a substantially inert support material and an adherent, uniform and preferably pellicular deposit of silver formed in the presence of the support material and upon the surface thereof. The invention is also directed to a practical and economical method for preparing such catalysts.

Silver catalysts are well known. They have been prepared both in the massive form and in a finely divided state. In the massive form they have been prepared as silver leaf, sponge, mesh, pellet, etc. Finely divided silver catalysts have been prepared by thermally decomposing suitable silver compounds, preferably in a reducing or inert medium, or by precipitating metallic silver from solutions or suspensions of silver compounds. Finely divided silver has also been deposited in this manner upon suitable carriers or support materials, e. g. charcoal, diatomaceous earths, crushed firebrick, fuller's earth, fused alumina, marble, sandstone, selected clays, and the like.

The use of these well known catalysts is attended by certain disadvantages. For instance, the massive catalysts require too much silver to be commercially attractive. Similarly, the finely divided unsupported catalysts of the prior art require relatively large amounts of silver and in addition they tend to sinter and lose their activity. The known supported silver catalysts lack durability of structure, especially when contacted with liquids either prior to or during the operation of the catalytic process in which they are used, and tend to lose their initial catalytic activity too rapidly, particularly at elevated temperatures. They also lack uniformity of composition. Such lack of uniformity results in variations in catalyst behavior during operation, thereby necessitating costly and time-consuming readjustment of operating conditions whenever the catalyst is replaced.

It is an object of this invention to avoid the above and other defects of the prior art and to provide novel and superior silver-metal-containing catalyst compositions having a high initial activity in a wide variety of chemical reactions, and capable of retaining their high activity over long periods of use, e. g. for several hundred hours of operation at elevated temperatures. It is another object to provide compositions containing comparatively very small, but nevertheless adequate, amounts of the costly silver metal per unit volume of catalyst, these compositions being characterized by exceptional durability, superior retention of catalytic activity under widely varying conditions of use, and, in many instances, by high thermal conductivity. It is a further object to provide methods for the preparation of such superior silver catalysts.

It has now been found that such active, durable, uniform, efficient and economical catalysts may be prepared by chemically reducing an ammoniacal suspension or solution of a silver compound in the presence of a suitable support material under conditions effecting the deposition of a uniform, adherent deposit of active, metallic silver upon the surface of the support material.

Broadly stated, the invention resides in a novel catalyst and in a process for preparing the same, this process comprising silvering a suitable carrier or support material by treating it successively and preferably in the order named with a solution or suspension of a silver compound, ammonia or ammonium hydroxide, a strong base such as sodium hydroxide, a further quantity of ammonia or ammonium hydroxide, and a reducing agent. Upon allowing the carrier or support material to stand in contact with each of these reagents for optimum periods of time, a thin film of silver, usually in the form of a silver mirror, is deposited upon the support. This forms the desired catalytic surface. When the catalyst is prepared in the stated manner, a fine, even, uniform deposit of silver presenting a highly active catalytic surface not obtainable by prior art methods for preparing silver catalysts is obtained. In addition, the amount of costly silver metal required to form the desired catalytic silver surface is very small; in fact, much smaller than is usually required in the preparation of the ordinary silver catalysts.

More specifically stated, the novel silver catalysts of the invention are prepared by a process including the following steps: heating a mixture comprising a carrier or support material and a solution or suspension of an organic or inorganic silver compound, such as silver oxalate, silver tartrate, or silver nitrate; adding an ammonium hydroxide solution or gaseous ammonia to the solution of the silver salt in which the support material is immersed, the ammonia or ammonium hydroxide being added in an amount just sufficient to redissolve the silver oxide precipitate formed by the addition of the first small quantities of the reagent; adding a sufficient amount of a strong base, e. g. sodium hydroxide or potassium hydroxide, to make the solution strongly alkaline and to precipitate the silver as silver oxide; adding a further quantity of ammonia or ammonium hydroxide in an amount just sufficient to dissolve the silver oxide precipitate and to maintain the silver in solution in the form of a silver-ammonia complex; adding a reducing agent such as glucose, sodium potassium tartrate, hydrazine, phenylhydrazine, hydroxylamine, or aliphatic aldehydes, e. g. formaldehyde; and allowing the resulting mixture of silver solution and reducing agent to stand with or without heating until a thin, uniform film of metallic silver, usually in the form of a silver mirror, is deposited upon the support surface. The amount of silver so deposited is quite small, i. e. about 0.5 gram to 2.0 grams per 100 cc. of catalyst, as compared with from 10 grams to 25 grams of silver per 100 cc. of catalyst in the case of ordinary silver catalysts. Although the silver content of the catalysts of the invention is small, the surface area af the silver is very large as compared with the total weight of silver present. The activity of the catalyst is therefore very high and need not be increased by any special procedure, as by etching. However, as outlined hereinbelow, suitable promoters may be added, if desired, to make the catalyst even more active.

The silver catalysts of the invention may be prepared by using any of a large number of carriers or support materials. Although finely divided porous materials such as diatomaceous earth, fuller's earth, selected clays and the like comprise suitable support materials, it is generally preferred to use materials of a larger particle size such as pumice, calcined granular diatomaceous earth, porous granules of silica, silicon carbide, alumina, carbon, magnesium oxide, crushed firebrick, bauxite, sandstone, majolica, artificial and natural zeolites, and metal oxide gel-type materials comprising the oxides of chromium, molybdenum, tungsten, and the like. Also, mixtures of these materials may be used. Porous aggregates may be prepared by bonding together granules of one or several of the above materials. Aggregates comprising from 75% to 90% of alumina and 25% to 10% of silica bonded together by fusing with a ceramic bonding clay or other bonding material, provide exceptionally good supports.

Catalysts possessing the advantages and properties peculiar to silver in pellicular, or skin-like, form are obtained by the deposition of silver metal on any of a large number of solid carriers or support materials in accordance with the process of the invention. Catalysts possessing unusual and particularly outstanding characteristics, attributable to the nature of the support material, are obtained by combining silver in the skin-like, or pellicular, form with elemental silicon and/or silicon carbide. These catalyst compositions are described and claimed in co-pending application Serial Number 498,430, filed August 11, 1943.

In a preferred embodiment of the invention, any one of these or similar carriers may be added to an aqueous solution of silver nitrate, the mixture being then boiled for from 10 minutes to 30 minutes in order to thoroughly impregnate the support material with the silver nitrate solution. Ammonium hydroxide is then slowly added in an amount just sufficient to redissolve the precipitate initially formed. To this solution there is then slowly added an aqueous solution of a strong base, e. g. sodium hydroxide, in an amount which may vary between a slight excess and about three times the stoichiometric equivalent required to convert the silver present to silver oxide, the amount of the base thus added being in any case sufficient to make the solution strongly alkaline. Ammonium hydroxide is then added in an amount just sufficient to dissolve the silver oxide precipitate and to maintain the silver in solution. A reducing agent, such as glucose, is then added to the mixture to reduce the redissolved silver compound and to precipitate the metallic silver upon the inert support material. The mixture of silvering solution, reducing solution and support material may be allowed to stand at room temperature for a period of time sufficient to effect the deposition of the desired amount of metallic silver upon the support. The time required will vary, at least in part, depending on the nature of the solutions used, but may be, for example, from ½ to 1½ hours. After the mixture has stood for the desired or optimum period of time, the liquid may be decanted from the catalyst, which latter may then be washed with water, for example, by decantation, to remove the water soluble material. The catalyst so prepared is in an active form and need not be subjected to an activating treatment or dried. However, drying by any suitable means, as by heating or subjection to reduced pressure may be employed, if desired.

Although, as stated, the catalysts prepared in the described manner are already in an active form, their activity may, if desired, be further promoted or modified by the addition in the desired or optimum amount of any one or more of a plurality of elements or compounds which are known to promote or modify the catalytic activity of silver metal. Representative promoters are, for example, the metals such as gold, copper, platinum, nickel, iron, etc.; the metal oxides and other metal compounds, particularly the alkali metal and alkaline earth metal oxides, hydroxides and carbonates; and some halogen compounds. The activity of the catalysts may, in many instances, be further materially increased or promoted by the addition of small amounts of a sodium compound. Such promoted catalysts may be prepared by adding the desired or optimum quantity, i. e. up to about 8% calculated as per cent of silver present, of a sodium compound, e. g. sodium hydroxide or sodium nitrate. The sodium compound may be conveniently added in the form of an aqueous solution which is poured over the silvered support, the excess sodium solution being then removed by decantation and the wet silvered support dried to leave a deposit of sodium compound upon the catalyst surface. It has been found particularly effective, however, to add about three volumes of water to the freshly prepared but unwashed silver catalyst prepared as described hereinabove. In accordance with this procedure, the mixture of silvered support material and residual silvering solution is diluted with about three volumes of water. The silvered support material is then drained and dried. This leaves a residue of sodium compounds from the silvering solution on the catalyst surface and results in the formation of a particularly active catalytic surface. Such promoted catalysts give higher yields and higher conversions than do the unpromoted catalysts. They are also active at lower temperatures and are less susceptible to poisoning.

Although the foregoing represents a preferred procedure for preparing the silver catalysts of the invention, the procedure used may vary within reasonably wide limits. For instance, instead of impregnating the carrier with a silver salt solution and then adding ammonium hydroxide, an ammoniacal silver salt solution may be prepared and the carrier material impregnated therewith. Alternatively, a silvering solution comprising a suitable silver salt, an alkali metal hydroxide, ammonium hydroxide and a reducing agent may be prepared as described above prior to the addition of the support material. The support material may then be added thereto and its silvering effected in the usual manner. In such a case, however, the support material must be added substantially immediately after mixing the components of the silvering solution. Other modifications may be made as necessary without departing from the scope of the invention as defined hereinabove.

The catalyst support may be pretreated, if desired, as by etching with hydrogen fluoride or washing with sodium hydroxide.

The following examples are given as illustrative of the method of preparing the silver catalysts of the invention.

Example I

To 100 cc. of a thoroughly washed pumice there was added 200 cc. of a 0.147 N silver nitrate solution. The mixture was boiled for 15 minutes and then cooled to 20° C. To the cooled mixture there was slowly and successively added 6 cc. of 28% ammonium hydroxide and 100 cc. of 0.8 N NaOH solution, the mixture being stirred throughout said additions. An additional 3 cc. of 28% ammonium hydroxide solution was added and the stirring continued for about five minutes.

A reducing solution was prepared by dissolving 8.0 grams of cane sugar in 80 cc. water, adding 10 cc. of ethyl alcohol and 0.35 cc. of concentrated $HNO_3$ to the sugar solution, and boiling the resulting solution for about 5 minutes.

About 12 cc. of the cooled reducing solution was rapidly added to the above mixture of pumice and silver solution. The resulting mixture was allowed to stand for one hour with occasional shaking. The spent silvering solution was then diluted with about 3 volumes of water, and the diluted solution decanted from the silvered pumice.

Example II

A thoroughly washed porous 8/16 mesh ceramically bonded alumina and silica support material containing about 85% alumina and 11% silica was degassed by subjecting it to a subatmospheric pressure. To 150 cc. of the degassed support there was added 200 cc. of a 0.147 N silver nitrate solution. The mixture was boiled for 15 minutes and then cooled to about 20° C. To the cooled mixture there was slowly and successively added 6 cc. of 28% $NH_4OH$ and 100 cc. of 0.8 N NaOH solution, the mixture being stirred throughout said additions. An additional 3 cc. of 28% $NH_4OH$ was added and the stirring continued for about 5 minutes. 150 cc. of the glucose reducing solution, prepared by the method used in Example I, was rapidly added to the mixture of support and silver solution and the mixture allowed to stand for 2 hours. The liquid was then decanted from the solid catalyst and the catalyst washed with water.

Example III

To 100 cc. of a thoroughly washed pumice there was added 220 cc. of 0.118 N silver nitrate solution. The mixture was boiled for 15 minutes and cooled to a temperature of about 20° C. To the cooled mixture there was slowly added with stirring 2 cc. of 28% ammonium hydroxide and the stirring was continued for about 5 minutes. To the resulting mixture there was rapidly added with stirring 44 cc. of an aqueous formaldehyde solution containing 3 gm. of formaldehyde. The mixture was allowed to stand for 1 hour. The liquid was then decanted from the solid catalyst, and the catalyst then washed with water.

Example IV 25 cc. of the catalyst prepared as described in Example I was placed in a Pyrex tube having an internal diameter of 20 mm. An ethylene-air mixture consisting of 1 part by volume of ethylene and 5 parts by volume of air was passed continuously over the catalyst at a temperature of 250° C., at substantially atmospheric pressure, and at the rate of 60 cc. of the ethylene-air mixture per hour. This gave an ethylene to oxygen ratio of about one to one and a contact time of about 25 seconds. At the end of 80 hours of operation, the conversion per pass of ethylene to ethylene oxide based on ethylene charged was 20%, while the yield of ethylene oxide based on the total oxidized ethylene was 62%.

Because of their great catalytic activity at relatively low temperatures, their low silver content and their durability, the silver catalysts prepared in accordance with the process of the invention will be found to be highly advantageous and economical for use in a wide variety of chemical reactions, conducted in either the liquid or vapor phase. Typical operations wherein they may advantageously be used comprise the oxidation of saturated and unsaturated hydrocarbons, the production of aldehydes and ketones by the oxidation of the corresponding primary and secondary alcohols, the vapor phase hydration of lower olefins, the production of vinyl and other unsaturated ethers from aliphatic or aromatic acetals, the preparation of phenolic substances, e. g. the hydrolysis of chlorobenzene to phenol, the hydrolysis of dichlorobenzene to dihydroxybenzene, the fluorination of benzene, the production of hydrocyanic acid from mixtures of ammonia, oxygen and aliphatic or aromatic hydrocarbons, and many hydrogenation and dehydrogenation reactions such as the hydrogenation of aromatic nitro compounds to the corresponding amines or the dehydrogenation of unsaturated amines to unsaturated nitriles in the presence of oxygen or oxygen containing gases, etc.

The catalysts of the invention are particularly effective in catalyzing the direct oxidation of olefins to the corresponding olefin oxides. Silver deposited in accordance with the method of the invention on a number of support materials has invariably shown activity in catalyzing the direct oxidation of ethylene to ethylene oxide even when known methods of depositing the silver on the same support material failed to provide an active catalyst. The use of the catalysts of this invention in the oxidation of olefins to the corresponding olefin oxides is claimed in our copending application, Serial No. 498,429, filed August 11, 1943.

We claim as our invention:

1. A catalyst consisting essentially of a granular porous support material and an adherent, uniform, pellicular deposit of silver metal formed upon and in the presence of said support material by the action of a reducing agent upon an ammoniacal solution of silver nitrate and sodium hydroxide.

2. A catalyst consisting essentially of a granular porous support material and an adherent, uniform, pellicular deposit of silver metal formed upon and in the presence of said support material by the action of a reducing agent upon an ammoniacal solution of silver nitrate and an alkali metal hydroxide.

3. A catalyst consisting essentially of a granular porous support material and an adherent, uniform, pellicular deposit of silver metal formed upon and in the presence of said support material by the action of a reducing agent upon an ammoniacal solution of a silver salt and sodium hydroxide.

4. A catalyst consisting essentially of a granular porous support material and an adherent, uniform, pellicular deposit of silver metal formed upon and in the presence of said support material by the action of a reducing agent upon an ammoniacal solution of a silver salt and an alkali metal hydroxide.

5. A catalyst consisting essentially of a granular porous support material and an adherent, uniform, pellicular deposit of silver metal formed upon and in the presence of said support material by the action of a reducing agent upon an ammoniacal solution of a silver salt and a strong base.

6. A catalyst composition consisting essentially of a granular porous support material and an adherent, uniform, pellicular deposit of silver metal formed upon and in the presence of the support material by mixing granules of a substantially inert porous material with an aqueous solution of silver nitrate, adding ammonium hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, and separating the silvered support material from the reaction mixture.

7. A catalyst composition consisting essentially of a granular porous support material and an adherent, uniform, pellicular deposit of silver metal formed upon and in the presence of the support material by forming a mixture comprising a substantially inert porous material and an aqueous ammoniacal solution of silver salt, introducing an alkali metal hydroxide into said mixture in an amount sufficient to precipitate the silver in the form of silver oxide, adding ammonium hydroxide in an amount substantially only sufficient to redissolve the silver and maintain it in solution, reacting said solution with a reducing agent for a period of time sufficient to effect the formation of an adherent, uniform, pellicular deposit of silver upon the support material, and separating said silvered support material from the reaction mixture.

HARRY DE V. FINCH.
INGOLFUR BERGSTEINSSON.

REFERENCES CITED

The following references are of record in the file of this patent:

UNITED STATES PATENTS

| Number | Name | Date |
| --- | --- | --- |
| 1,739,306 | Holmes | Dec. 10, 1929 |
| 2,113,977 | Barnes | Apr. 12, 1938 |
| 2,034,077 | Arnold et al. | May 17, 1936 |
| 2,178,454 | Metzger et al. | Oct. 31, 1939 |
| 2,245,183 | Christ et al. | June 10, 1941 |
| 1,937,728 | Storch | Dec. 5, 1933 |
| 2,355,933 | Weiss | Aug. 15, 1944 |
| 1,519,470 | Wilson et al. | Dec. 16, 1924 |
| 2,279,469 | Law et al. | Apr. 14, 1942 |

OTHER REFERENCES

The Making of Mirrors by the Deposition of Metal On Glass, Circular No. 389 of the Bureau of Standards, pages 2–11, 1931.

Pottery and Glassware Report of 1887. Article on The Process of Silvering Glass.